US012029693B2

(12) United States Patent
Aguglia et al.

(10) Patent No.: US 12,029,693 B2
(45) Date of Patent: Jul. 9, 2024

(54) SYSTEM FOR PREVENTING FALLS FROM A BED

(71) Applicant: UNIVERSITA' DEGLI STUDI MAGNA GRAECIA DI CATANZARO, Catanzaro (IT)

(72) Inventors: Umberto Aguglia, Catanzaro (IT); Edoardo Ferlazzo, Catanzaro (IT); Sara Gasparini, Catanzaro (IT); Sergio Mercuri, Catanzaro (IT); Giuseppe Minniti, Catanzaro (IT)

(73) Assignee: UNIVERSITA' DEGLI STUDI MAGNA GRAECIA DI CATANZARO, Catanzaro (IT)

( * ) Notice: Subject to any disclaimer, the term of this patent is extended or adjusted under 35 U.S.C. 154(b) by 471 days.

(21) Appl. No.: 17/293,218

(22) PCT Filed: Nov. 14, 2019

(86) PCT No.: PCT/IB2019/059776
§ 371 (c)(1),
(2) Date: May 12, 2021

(87) PCT Pub. No.: WO2020/104901
PCT Pub. Date: May 28, 2020

(65) Prior Publication Data

US 2021/0378895 A1 Dec. 9, 2021

(30) Foreign Application Priority Data

Nov. 19, 2018 (IT) ........................ 102018000010431

(51) Int. Cl.
*A61G 7/05* (2006.01)
*A61G 7/00* (2006.01)

(52) U.S. Cl.
CPC ............ *A61G 7/0516* (2016.11); *A61G 7/052* (2016.11); *A61G 2203/36* (2013.01); *A61G 2203/42* (2013.01)

(58) Field of Classification Search
CPC .. A61G 7/0516; A61G 7/052; A61G 2203/36; A61G 2203/42
(Continued)

(56) References Cited

U.S. PATENT DOCUMENTS 10,226,187 B2 * 3/2019 Al-Ali .................. A61B 5/0022
10,383,527 B2 * 8/2019 Al-Ali .................. A61B 5/7275
(Continued)

FOREIGN PATENT DOCUMENTS

EP 3344123 B1 * 10/2022 ........... A61B 5/0004
EP 4173554 A1 * 5/2023 ........... A61B 5/0004
(Continued)

OTHER PUBLICATIONS

International Search Report and Written Opinion of the International Searching Authority issued for International PCT Application No. PCT/IB2019/059776 dated Mar. 20, 2020.

*Primary Examiner* — Robert G Santos
(74) *Attorney, Agent, or Firm* — Howson & Howson LLP

(57) ABSTRACT

System for preventing a patient from falling from a bed, the system comprising first and second protective side barriers adapted to be positioned along first and second side edges of the bed, respectively, and are configured to be lifted or lowered by varying the height thereof from minimum to maximum height. The system includes anchoring means for fixing the protective side barriers to a bed frame, sensors adapted to detect the position taken by the patient on a mattress of the bed, and a control unit configured to receive data collected by the sensors and, on the basis of the data, determine in real time a lifting or lowering of a predeter-
(Continued)

mined extent of the protective side barriers, up to heights of the protective side barriers ranging between the minimum and the maximum height, depending on the position taken by the patient on the mattress.

8 Claims, 1 Drawing Sheet

(58) Field of Classification Search
USPC .............................................. 5/428, 425, 424
See application file for complete search history.

(56) References Cited

U.S. PATENT DOCUMENTS

| | | | | |
|---|---|---|---|---|
| 10,448,844 | B2 * | 10/2019 | Al-Ali | A61B 5/1118 |
| 10,736,518 | B2 * | 8/2020 | Al-Ali | A61B 5/6801 |
| 10,932,970 | B2 * | 3/2021 | Lightcap | G05B 15/02 |
| 11,089,963 | B2 * | 8/2021 | Al-Ali | A61B 5/7264 |
| 11,576,582 | B2 * | 2/2023 | Al-Ali | A61B 5/05 |
| 2017/0055851 | A1 * | 3/2017 | Al-Ali | A61B 5/1117 |
| 2017/0055882 | A1 * | 3/2017 | Al-Ali | A61B 5/1126 |
| 2017/0055887 | A1 * | 3/2017 | Al-Ali | A61B 5/25 |
| 2017/0055896 | A1 * | 3/2017 | Al-Ali | A61B 5/68335 |
| 2019/0231199 | A1 * | 8/2019 | Al-Ali | A61B 5/002 |
| 2020/0060910 | A1 * | 2/2020 | Lightcap | A61B 5/1128 |
| 2020/0214621 | A1 * | 7/2020 | Keroles | A61B 5/6831 |
| 2021/0045641 | A1 * | 2/2021 | Al-Ali | A61B 5/002 |
| 2021/0137760 | A1 * | 5/2021 | Lightcap | H04N 7/183 |
| 2021/0330200 | A1 * | 10/2021 | Al-Ali | A61B 5/746 |
| 2021/0378895 | A1 * | 12/2021 | Aguglia | A61G 7/0516 |
| 2023/0038381 | A1 * | 2/2023 | Al-Ali | A61B 5/002 |

FOREIGN PATENT DOCUMENTS

| | | | | |
|---|---|---|---|---|
| JP | 2001-276150 | A | 10/2001 | |
| JP | 2006-051212 | A | 2/2006 | |
| KR | 10-2017-0004046 | A | 1/2017 | |
| WO | WO-2017040700 | A2 * | 3/2017 | A61B 5/0004 |
| WO | WO-2017040700 | A3 * | 4/2017 | A61B 5/0004 |
| WO | WO-2019060250 | A1 * | 3/2019 | A61B 5/11 |
| WO | WO-2020104901 | A1 * | 5/2020 | A61G 7/0516 |

* cited by examiner

SYSTEM FOR PREVENTING FALLS FROM A BED

TECHNICAL FIELD

The present invention relates, in general, to the field of accessory systems for beds, in particular systems for preventing falls from bed.

The system for preventing falls from bed finds particular application in the field of beds designed for patients.

BACKGROUND ART

The problem of accidental falls of patients from beds is generally known. In particular, in patients with psychomotor agitation and delirium, during acute hospitalization or in chronic conditions at home or in health care facilities, accidental falls represent an important cause of physical damage in about 30% of cases (Hitcho, E. B.; Krauss, M. J.; Birge, S.; Claiborne Dunagan, W.; Fischer, I.; Johnson, S.; Nast, P. A.; Costantinou, E.; Fraser, V. J. Characteristics and circumstances of falls in a hospital setting. J. Gen. Intern. Med. 2004, 19, 732-739) and they are a possible source of severe disability and a cause of increased hospitalisation time and mortality (Child S, Goodwin V, Garside R et al. Factors influencing the implementation of fall-prevention programmes: a systematic review and synthesis of qualitative studies. Implement Sci 2012; 7:91. Cumbler E U, Simpson J R, Rosenthal L D et al. Inpatient falls: defining the problem and identifying possible solutions. Part I: an evidence-based review. Neurohospitalist. 2013; 3:135-43. Hong H J, Kim N C, Jin Y et al. Trigger factors and outcomes of falls among Korean hospitalized patients: analysis of electronic medical records. Clin Nurs Res 2015; 24:51-72. Schwenk M, Lauenroth A, Stock C et al. Definitions and methods of measuring and reporting on injurious falls in randomised controlled fall prevention trials: a systematic review. BMC Med Res Methodol 2012; 12:50). Falls are also reported as the second most critical adverse event during hospitalization (Nascimento C C, Toffoletto M C, Goncalves L A et al. Indicators of healthcare results: analysis of adverse events during hospital stays. Rev Lat Am Enfermagem 2008; 16:746-51.) and most of them take place close to beds and chairs (Vassallo, M.; Amersey, R. A.; Sharma, J. C.; Allen, S. C. Falls on integrated medical wards. Gerontology 2000, 46, 158-162. Oliver, D.; Hopper, A.; Seed, P. Do hospital fall prevention programs work? A systematic review. J. Am. Geriatr. Soc. 2000, 48, 1679-1689).

Fall prevention systems using mobile side barriers are known.

For example, document JP2001276150 describes a bed that includes mobile safety barriers and sensors arranged on the bed to determine if the patient is positioned near the side edges of the bed. When said sensors detect that the patient is near the edges of the bed, the side barriers are automatically raised from a lowered starting position to a raised end position.

The solution described in JP2001276150 with only a lowered starting position and a raised end position of the side barriers does not allow a timely reaction to dangerous situations when the barriers are lowered or gives the patient a possible feeling of claustrophobia when the barriers are raised.

The object of the present invention is to overcome the problems and limitations of prior art by providing a system of prevention of falls from a bed that is safe and fast in reacting to situations of risk and at the same time avoids generating feelings of claustrophobia in patients.

This and other objects are achieved by the fall prevention system as claimed in the appended claims.

SUMMARY OF THE INVENTION

The system according to the present invention for preventing a patient from falling from a bed includes a first protective side barrier and a second protective side barrier that are configured to be raised and lowered, anchoring means for anchoring the protective side barriers to a bed frame, a plurality of sensors and a control unit configured to receive data collected by the sensors and, on the basis of such data, raise or lower the protective side barriers to prevent a patient from falling from bed.

The first protective side barrier and the second protective side barrier are arranged along a first side edge and along a second side edge of the bed, respectively, and are configured to be raised and lowered by varying the height thereof from a minimum height to a maximum height.

The anchoring means for fixing the protective side barriers to the bed frame comprise one or more anchoring bars attached to the protective side barriers and at least one bracket arranged to attach each anchoring bar to the bed frame.

The sensors include sensors to detect the position taken by the patient on a mattress of the bed. These sensors are, for example, load cells distributed on the mattress so as to detect on which portion of the mattress the patient is positioned.

The sensors of the system also include an accelerometric sensor applicable to the patient's body in order to detect the acceleration of the patient's movements, and a gyro sensor, this too being applicable to the patient's body, to detect the decubitus of the patient (lying supine, prone or in a lateral position).

The control unit is configured to receive data collected by the sensors and, on the basis of this data, to cause in real time a raising or lowering of the first and second protective side barriers by a predetermined extent, up to heights of the first and second protective side barriers between the minimum and maximum heights, depending on the position taken by the patient on the mattress. In particular, the height to which the first and second protective side barriers are raised or lowered is proportional to a distance (e.g. minimum distance) measured between the portion of the mattress on which the patient is positioned and the side edges of the bed.

The control unit, based on the acceleration detected by the accelerometer sensor, also determines, in real time, the speed at which the first and second protective side barriers are raised.

The control unit, based on the patient's decubitus, detected by the gyro sensor, is also configured to modulate the extent of raising and the speed of raising of the first and second protective side barriers.

According to the present invention, the control unit causes raising or lowering of said first and second protective side barriers independently of each other, by acting on the respective electromechanical actuators.

The protective side barriers of the fall prevention system according to the invention are therefore constantly repositioned, in an adaptive way, quickly responding to emergency conditions, drastically reducing the possibility of falling from bed. In addition, the adaptive positioning of the protective side barriers reduces the patient's discomfort caused by the presence of a stable restraint structure (fixed barriers).

BRIEF DESCRIPTION OF THE DRAWINGS

These and other features and advantages of the present invention will be more evident from the following description of preferred embodiments given by way of non-limiting examples with reference to the annexed drawings, in which elements designated by same or similar reference numeral indicate elements that have same or similar functionality and construction, and in which.

DESCRIPTION OF SOME PREFERRED EMBODIMENTS OF THE INVENTION

Figure 1:
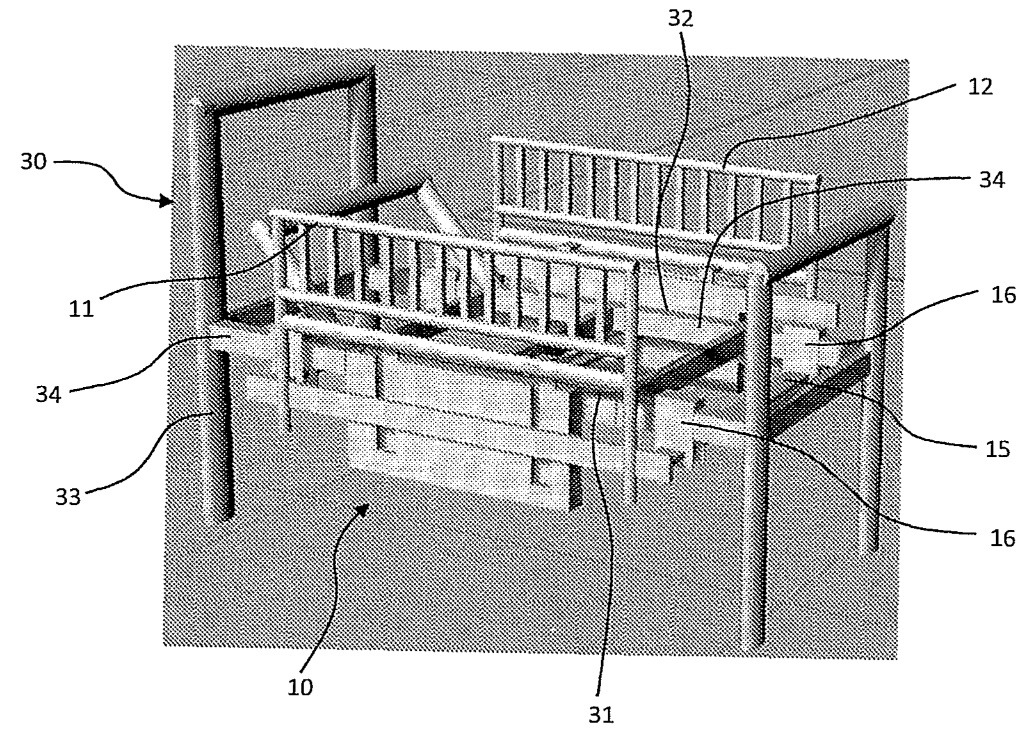
FIG. 1 is a perspective view of a bed and a first embodiment of a bed fall prevention system according to the present invention.

Referring to the annexed figures, a system 10 for preventing a patient from falling from a bed 30 according to the invention is illustrated below.

The fall prevention system 10 includes a first protective side barrier 11 and a second protective side barrier 12 that are configured to be raised and lowered, anchoring means 15, 16, 17 to fix the protective side barriers 11, 12 to a frame 33 of the bed 30, a plurality of sensors and a control unit configured to receive data collected by the sensors and, on the basis of such data, to raise or lower the protective side barriers 11, 12 in order to prevent a patient from falling from the bed 30.

The first protective side barrier 11 and the second protective side barrier 12 are arranged along a first side edge 31 and along a second side edge 32 of the bed 30, respectively. Each protective side barrier 11, 12 is configured so as to vary their height independently of each other, from a minimum height, at which the barrier 11, 12 is arranged below a plane passing through the upper surface of the mattress (not shown) of the bed 30, to a maximum height, at which the barrier 11, 12 extends at least partially above said plane.

Figure 2:
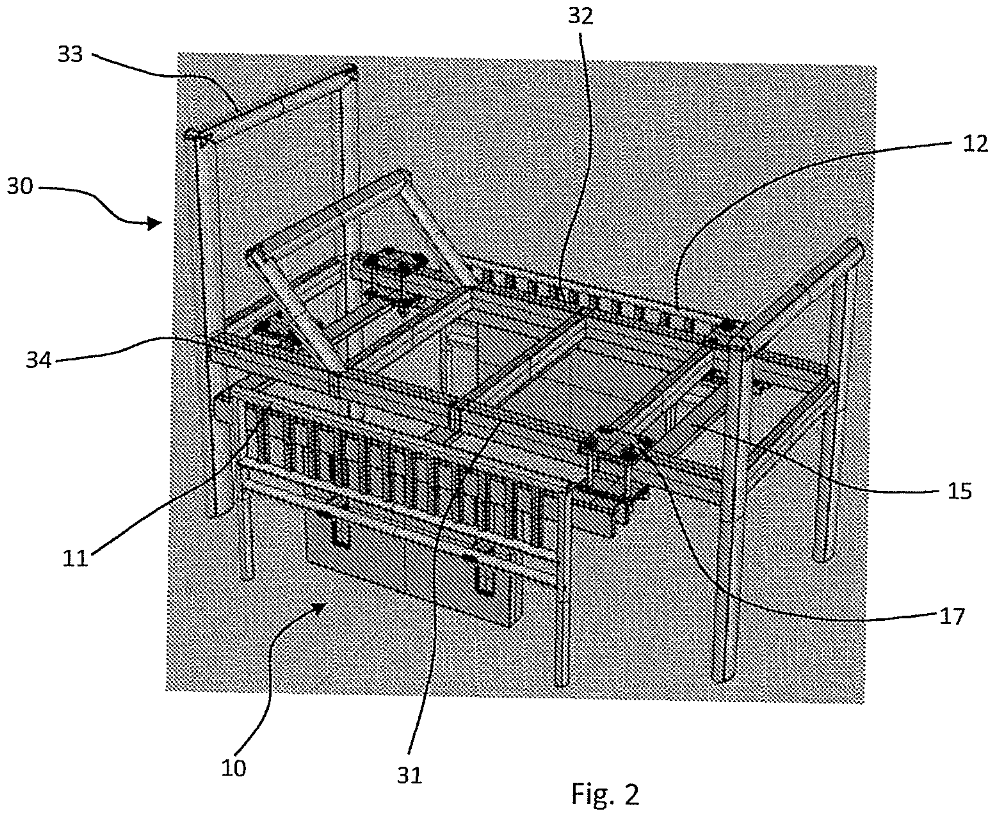
FIG. 2 is a perspective view of a bed and a second embodiment of a bed fall prevention system according to the present invention.

The anchoring means comprise one or more anchoring bars 15 connected to each protective side barrier 11, 12, and at least one bracket 16 or 17 arranged to connect each anchoring bar 15 to the frame 33 of the bed 30. For example, the anchoring bars 15 are horizontal bars, perpendicular to the side edges 31, 32 of the bed 30. According to a first embodiment, shown in FIG. 1, the brackets are run-through brackets 16 having the shape of an upside-down "U" and adapted to be fitted onto horizontal bars 34 of the frame 33 of the bed 30 that are parallel to the side edges 31, 32 of the bed 30, said run-through brackets being provided with slots for passage of the anchoring bars 15 therethrough. As the run-through brackets 16 can slide along the anchoring bars 15, this allows the system 10 to adapt to various shapes of the frame 33 of the bed 30. According to a second embodiment, shown in FIG. 2, the brackets are cross brackets 17.

The sensors of the system include sensors adapted to detect the position taken by the patient on a mattress. For example, such sensors are a plurality of load cells distribute, preferably evenly distributed, on the mattress, for example attached to the upper surface of the mattress or integrated in a mattress cover. Such load cells, by sensing the patient's load, are adapted to detect the mattress portion occupied by the patient and, consequently, also the direction of movement of the patient on the mattress.

The sensors of the system further include a gyro sensor and an accelerometric sensor. The gyro sensor, to be applied to the patient's body, for example to his/her torso, allows to detect the decubitus of the patient (lying supine, prone or in a lateral position). The accelerometric sensor, also to be applied to the patient's body, for example to his/her torso, allows to detect the acceleration of the patient's movements.

The fall prevention systems 10 further includes a communication interface (not shown), adapted to receive, either in a wireless or wired manner for the load cells and in a wireless manner for the gyro sensor and the accelerometric sensor, the signals coming from the sensors. Said interface will cause all the data collected by the sensors to convergently flow to the control unit (not shown), which is attachable, for example, to the frame 33 of the bed 30.

The control unit is configured to receive the data collected by said sensors and, on the basis of said data, determine in real time a raising or lowering of the first and second protective side barriers 11, 12, independently of each other, by means of electromechanical actuators of known type (not shown), so that the height of each side barrier 11, 12 takes a value comprised between said minimum height and said maximum height, depending on the data collected by the sensors.

In particular, based on the position taken by the patient on the mattress, detected by the load cells, the control unit causes the raising or lowering, in real time, of each protective side barrier 11, 12, so that the height of each of them is proportional to a distance (for example the minimum distance) detected between the portion of the mattress occupied by the patient and a side edge 31, 32 of the bed 30. Based on the patient's acceleration, detected by the accelerometric sensor, the control unit determines, in real time, the speed of raising of each protective side barrier 11, 12: the higher the acceleration detected, the higher the speed of raising. Finally, based on the patient's decubitus, detected by the gyro sensor, the control unit calibrates/modulates the extent of changes in positioning (i.e. the extent of raising and the speed of raising) of each protective side barrier 11, 12: if the detected position is close to or adherent to the upper surface of the mattress, the response of the control unit to the displacements detected by the load cells and the accelerometer will be less intense, and vice versa.

Therefore, the control unit analyzes the data coming from the sensors, constantly determining a risk of the patient falling from bed 30, calculated as a continuous function of the data collected by the sensors, and, in real time, controls the electromechanical actuators for a constant adaptive positioning of the protective side barriers 11, 12, based on this risk of falling, in order to timely effect raising thereof to a height necessary to restrain the patient in bed 30. The protective side barriers 11, 12 thus constantly vary (except when the patient is immobile) their height according to the data collected and consequently, being always in an optimal position, they can reduce the time required to reach the height needed to prevent bed, thus increasing the effectiveness of the fall prevention system.

In conditions of low risk of bed fall or in case of immobility of the patient, the protective side barriers 11, 12 automatically position themselves at their minimum height. In addition, said adaptive positioning of the protective side barriers 11, 12 reduces the patient's discomfort caused by the presence of a stable restraint structure (fixed barriers).

According to the present invention, the positioning of the lateral protection barriers 11, 12 may also be effected manually by an operator (e.g. a nurse or caregiver), to allow the care of the patient or the execution of diagnostic/therapeutic procedures.

The control unit is optionally configured to alert the operator in the event of a high risk of bed fall, for example by means of an alarm on a dedicated application installed on a device supplied to the operator.

Optionally, it is also possible to provide for the implementation of a predictive analysis system using artificial intelligence to increase the efficiency and sensitivity of the adaptive positioning of the protective side barriers 11, 12.

This system may also use information from wearable sensors that measure biological parameters (ECG, blood pressure, oxygen saturation, sweating, breathing, etc.).

The system 10 for preventing a patient from falling from a bed 30 as described and illustrated is susceptible of further changes and modification falling within the same inventive principle.

The invention claimed is:

1. A system for preventing a patient from falling from a bed (30), said system comprising a first protective side barrier (11) and a second protective side barrier (12) that are adapted to be positioned along a first side edge (31) and a second side edge (32) of the bed (30), respectively, and are configured to be lifted or lowered by varying the height thereof from a minimum height to a maximum height, anchoring means (15, 16, 17) for fixing said first and second protective side barriers (11, 12) to a frame (33) of the bed (30), wherein the anchoring means (15, 16, 17) comprises one or more anchoring bars (15) connected to said first and second protective side barriers (11, 12) and at least one bracket (16, 17) arranged to connect each anchoring bar (15) to the frame (33) of the bed (30), sensors adapted to detect the position taken by the patient on a mattress of the bed (30), a control unit configured to receive data collected by said sensors and, on the basis of said data, determine in real time a lifting or lowering of a predetermined extent of said first and second protective side barriers (11, 12), up to heights of said first and second protective side barriers (11, 12) ranging between the minimum height and the maximum height, depending on the position taken by the patient on the mattress, and a gyro sensor applicable to patient's body in order to detect the patient's decubitus, wherein the control unit, on the basis of the patient's decubitus detected by the gyro sensor, and thus of the adherence of the patient's body to an upper surface of the mattress, modulates the lifting extent and lifting speed of said first and second protective side barriers (11, 12).

2. The system according to claim 1, wherein said sensors adapted to detect the position taken by the patient on a mattress of the bed (30) are load cells arranged on the mattress and adapted to detect on which portion of the mattress the patient is positioned, and wherein the height to which said first and second protective side barriers (11, 12) are lifted or lowered is proportional to a distance between said portion of mattress on which the patient is positioned and said side edges (31, 32) of the bed (30).

3. The system according to claim 2, further comprising an accelerometric sensor applicable to the patient's body in order to detect the acceleration of the patient's movements.

4. The system according to claim 3, wherein the control unit, on the basis of the acceleration detected by the accelerometric sensor, determines in real time the lifting speed of said first and second protective side barriers (11, 12).

5. The system according to claim 4, wherein the control unit causes lifting or lowering of said first and second protective side barriers (11, 12) independently of each other.

6. The system according to claim 1, further comprising an accelerometric sensor applicable to the patient's body in order to detect the acceleration of the patient's movements.

7. The system according to claim 6, wherein the control unit, on the basis of the acceleration detected by the accelerometric sensor, determines in real time the lifting speed of said first and second protective side barriers (11, 12).

8. The system according to claim 1, wherein the control unit causes lifting or lowering of said first and second protective side barriers (11, 12) independently of each other.

* * * * *